(12) United States Patent
Kim et al.

(10) Patent No.: US 8,714,194 B2
(45) Date of Patent: May 6, 2014

(54) LIQUEFIED PETROLEUM GAS PUMP

(75) Inventors: Myeong Hwan Kim, Hwaseong-si (KR); Buyeol Ryu, Hwaseong-si (KR); Chang Han Kim, Gwangju-si (KR); Pil Seon Chol, Suwon-si (KR); Yong-Nam Shin, Daegu-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 717 days.

(21) Appl. No.: 12/957,899

(22) Filed: Dec. 1, 2010

(65) Prior Publication Data

US 2012/0073684 A1     Mar. 29, 2012

(30) Foreign Application Priority Data

Sep. 28, 2010  (KR) .................. 10-2010-0093940

(51) Int. Cl.
| | |
|---|---|
| *F02M 37/10* | (2006.01) |
| *F02M 37/22* | (2006.01) |
| *F04B 17/03* | (2006.01) |
| *B67D 7/68* | (2010.01) |

(52) U.S. Cl.
USPC ............... 137/565.16; 137/565.24; 137/544; 123/509; 417/360; 417/423.3

(58) Field of Classification Search
USPC .............. 137/565.11, 565.16, 565.24, 544; 123/509, 525; 417/423.3, 360
See application file for complete search history.

(56) References Cited

FOREIGN PATENT DOCUMENTS

| | | | |
|---|---|---|---|
| JP | 2006083792 A | * | 3/2006 |
| KR | 746898 B1 | * | 8/2007 |
| KR | 100746898 B1 | | 8/2007 |
| KR | 200436614 Y1 | | 9/2007 |
| KR | 200439449 Y1 | | 4/2008 |
| KR | 827986 B1 | * | 5/2008 |
| KR | 20090033664 A | | 4/2009 |
| KR | 100916184 B1 | | 9/2009 |
| KR | 200446495 Y1 | | 10/2009 |
| KR | 2010069835 A | * | 6/2010 |
| KR | 1020100061970 A | | 6/2010 |
| KR | 1020100069835 A | | 6/2010 |

* cited by examiner

*Primary Examiner* — Craig Schneider
*Assistant Examiner* — Atif Chaudry
(74) *Attorney, Agent, or Firm* — Morgan, Lewis & Bockius LLP (57) ABSTRACT

A fuel pump for LPG (liquefied petroleum gas), may include a main bracket that may be mounted at a fuel tank, an integrated bracket that an end thereof may be fixed to the main bracket, the other end thereof may be extended to an inner side of the fuel tank, and the whole of the bracket may be integrally formed, and a pump unit that may be fixed to the other end of the integrated bracket with a space therebetween so as to pump liquefied fuel to an engine.

8 Claims, 7 Drawing Sheets

LIQUEFIED PETROLEUM GAS PUMP

CROSS-REFERENCE TO RELATED APPLICATION

The present application claims priority to Korean Patent Application No. 10-2010-0093940 filed in the Korean Intellectual Property Office on Sep. 28, 2010, the entire contents of which is incorporated herein for all purposes by this reference.

BACKGROUND OF THE INVENTION

1. Field of the Invention

The present invention relates to a fuel pump for LPG (liquefied petroleum gas) that is configured to pump LPG charged in a fuel tank to an engine with a low power consumption and low noise and that the assembly and the maintenance thereof is easy.

2. Description of Related Art

A vehicle using gas fuel has a fuel tank that liquefied gas fuel is stored and the liquefied fuel is supplied to an engine and is combusted therein to output energy.

Meanwhile, there has been an effort to minimize the noise generated when the gas fuel is supplied to the engine, to make the maintenance of the pump unit easy, and to design the structure thereof compactly.

Further, there has been an effort to decrease the noise when the fuel is returned to the fuel tank from the engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a fuel pump for pumping LPG having advantages that the maintenance thereof is easy, the structure is designed compactly, the noise is low when the fuel is returned thereto, and the appropriate amount of fuel is supplied to an engine.

In an aspect of the present invention, the fuel pump for LPG (liquefied petroleum gas), may include a main bracket that may be mounted at a fuel tank, an integrated bracket that an end thereof may be fixed to the main bracket, the other end thereof may be extended to an inner side of the fuel tank, and the whole of the bracket may be integrally formed, and a pump unit that may be fixed to the other end of the integrated bracket with a space therebetween so as to pump liquefied fuel to an engine.

The integrated bracket may be formed monolithically.

The pump unit may include a motor body coupled to the other end of the integrated bracket and including a motor therein, and at least a pumping portion to pump fuel by a torque of the motor.

The at least a pumping portion may include three pumping portions that may be disposed in a rotation direction of the motor so as to pump the fuel by a torque of the motor.

The fuel pump further may include a fixed rod that penetrates the main bracket and may be fixed on the main bracket, a torsion bar that may be rotatably mounted to an end portion of the fixed rod inside the fuel tank, an elastic member elastically biasing the torsion bar in a direction, a vent unit that may be mounted at an end portion of the torsion bar, and a vent pipe connected to the vent unit and transferring a lubricant gas vented from the motor to the vent unit.

A filter filtering foreign material in the fuel may be disposed at the outside of the fuel tank.

A multi valve set penetrates the main bracket and may be coupled thereto, wherein the multi valve set may include a relief valve releasing a pressure, a EFV (Excess Flow Valve) check valve restricting a fuel flux pumped by the pump within a predetermined value, and a return valve returning a fuel returned from the engine to the inside of the fuel tank.

A spare bracket penetrates the main bracket and coupled thereto and an end of a spare pipe that spare fuel remained after being pumped by the pump unit flows therethrough may be fixed on the spare bracket.

A spare separator may be fixed on the spare bracket and the spare pipe may be inserted into the spare separator.

The pump unit may be fixed by an insulation portion to the other end of the integrated bracket with the space therebetween.

As described above, the LPG fuel pump according to the present invention decreases consumption power through a three plunger type pump portion, and reduce noise and vibration. A separator venting lubricant is disposed at an upper side near the main bracket to prevent the LPG fuel from being flown into the separator, the integrated bracket reduces assembly cost and improve solidity, and a filter that was mounted in the pump case is mounted outside the fuel tank such that the replacement and the maintenance of the filter becomes easy.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
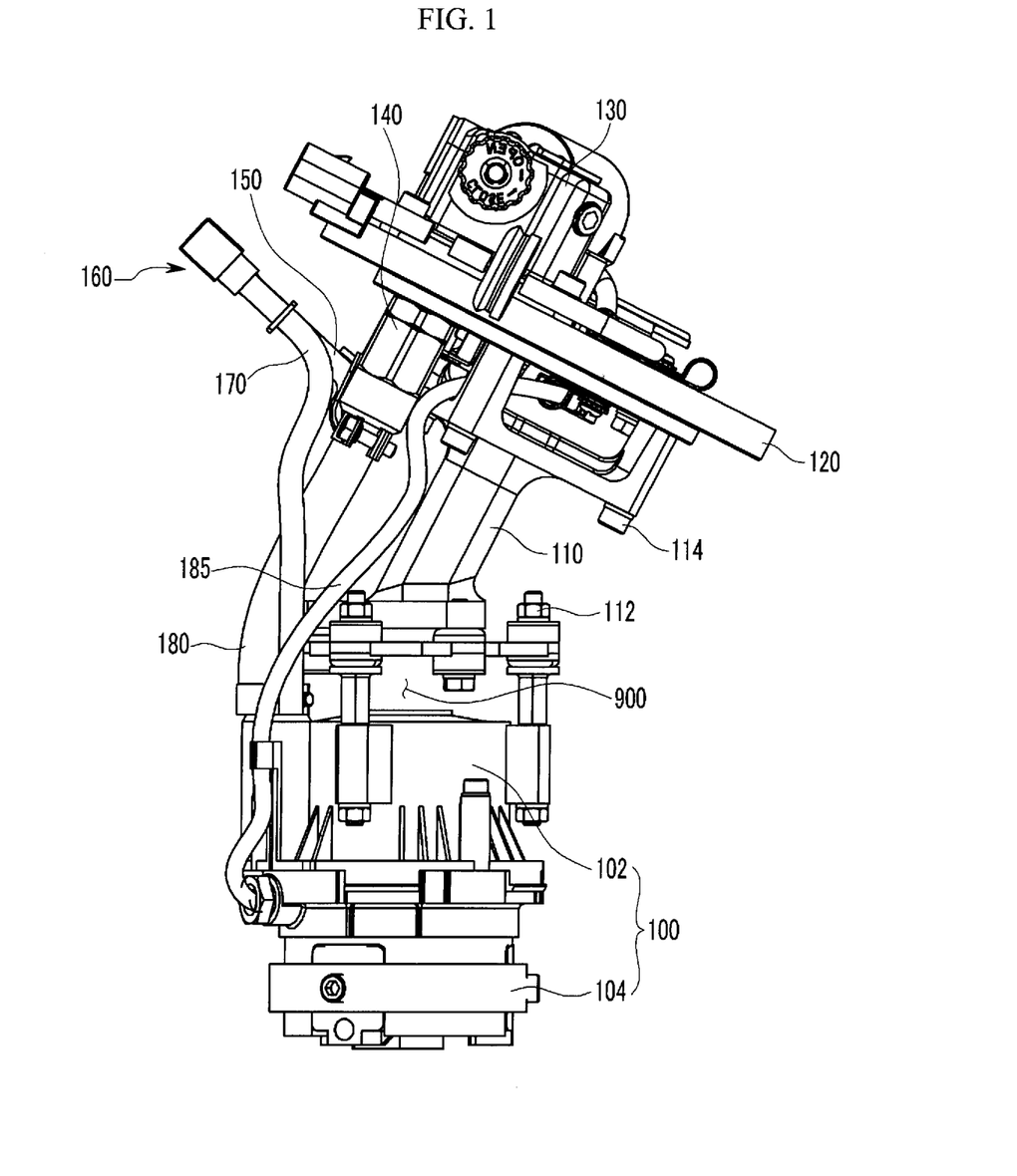
FIG. 1 is a side view of a LPG fuel pump according to an exemplary embodiment of the present invention.

FIG. 1 is a side view of a LPG fuel pump according to an exemplary embodiment of the present invention.

Referring to FIG. 1, a LPG fuel pump includes a main bracket 120, a multi valve set 130, an integrated bracket 110, a pump unit 100, a supply pipe 180, a vent pipe 170, a vent unit 160, a torsion bar 150, and an EFV check valve 140.

Figure 6:
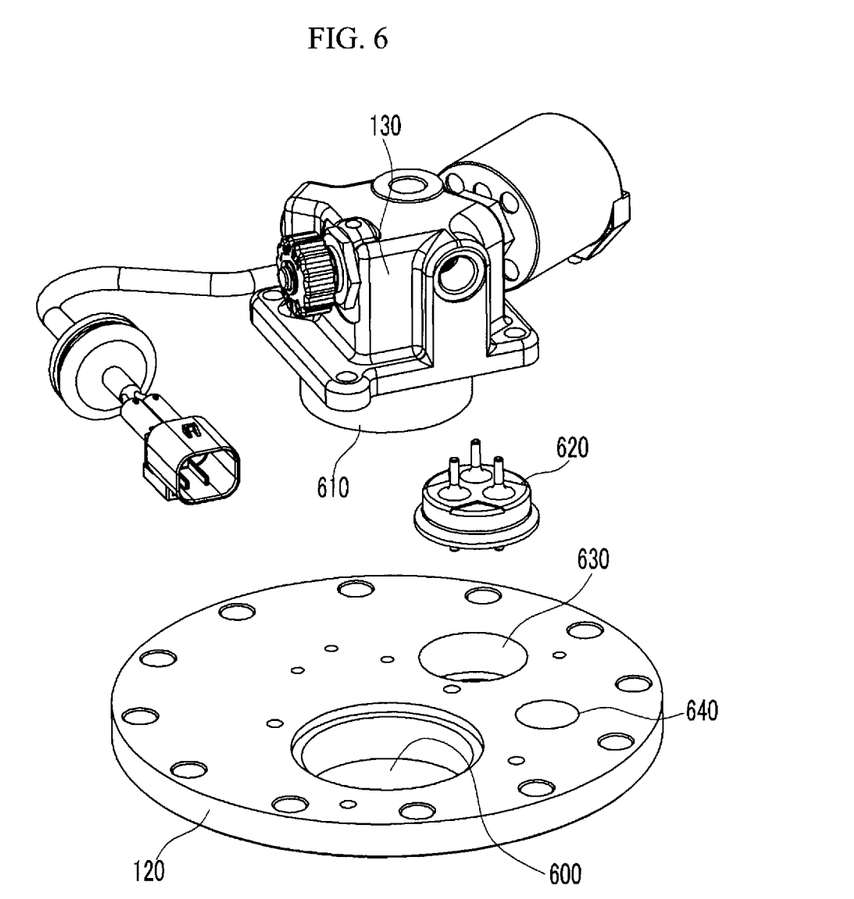
FIG. 6 is a partial exploded perspective view of a LPG fuel pump according to an exemplary embodiment of the present invention.

The multi valve set 130 is mounted on the main bracket 120. FIG. 6 is a partial exploded perspective view of a LPG fuel pump according to an exemplary embodiment of the present invention.

Referring to FIG. 6, a valve set hole 600 and a spare hole 630 are formed in the main bracket 120 with a distance from each other, an insertion portion 610 that is formed at a lower part of the multi valve set 130 is inserted in the valve set hole 600, and the spare bracket 620 is inserted in the spare hole 630. Further, a fixed rod mounting hole 640 is formed in the main bracket 120 next to the valve set hole 600 and the spare hole 630.

Figure 7:
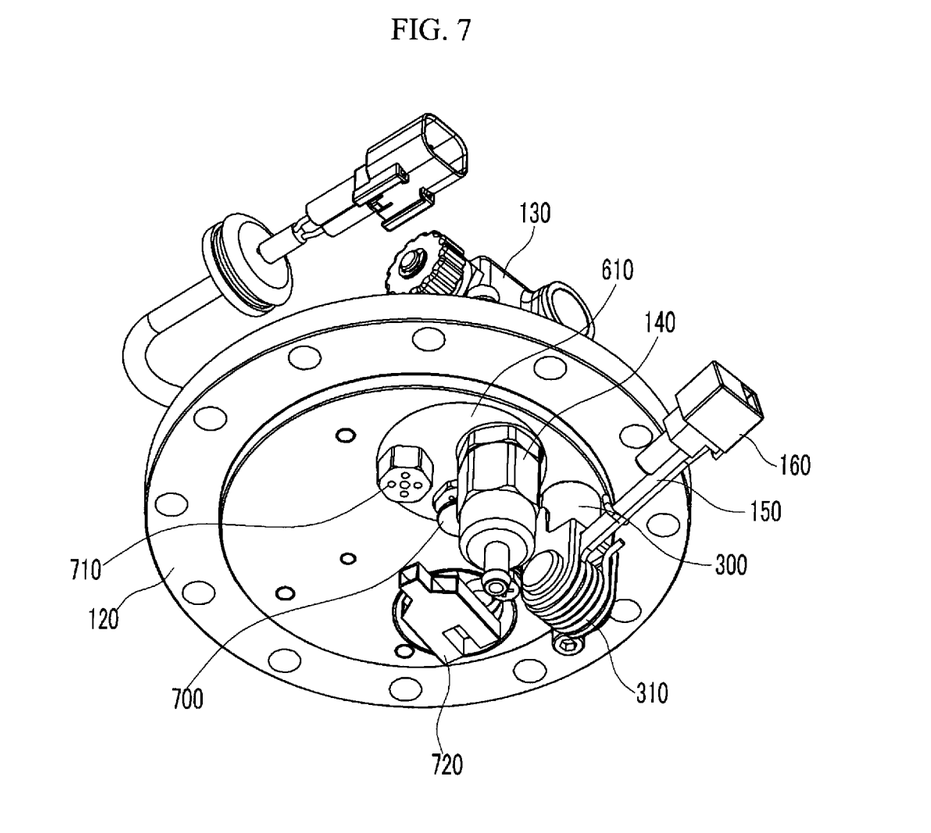
FIG. 7 is a perspective view of a main bracket in a LPG fuel pump according to an exemplary embodiment of the present invention.

FIG. 7 is a perspective view of a main bracket in a LPG fuel pump according to an exemplary embodiment of the present invention.

FIG. 7 shows a condition that the multi valve set 130 and the spare bracket 620 are mounted in the main bracket 120, as shown, a relief valve 710, an EFV check valve 140, and a return valve 700 are mounted at a lower end part of the insertion portion 610 of the multi valve set 130.

As described above, since the valves 140, 700, and 710 are mounted on the insertion portion 610 of the multi valve set 130, the valves can be easily exchanged by replacing the multi valve set 130 during the maintenance.

Figure 3:
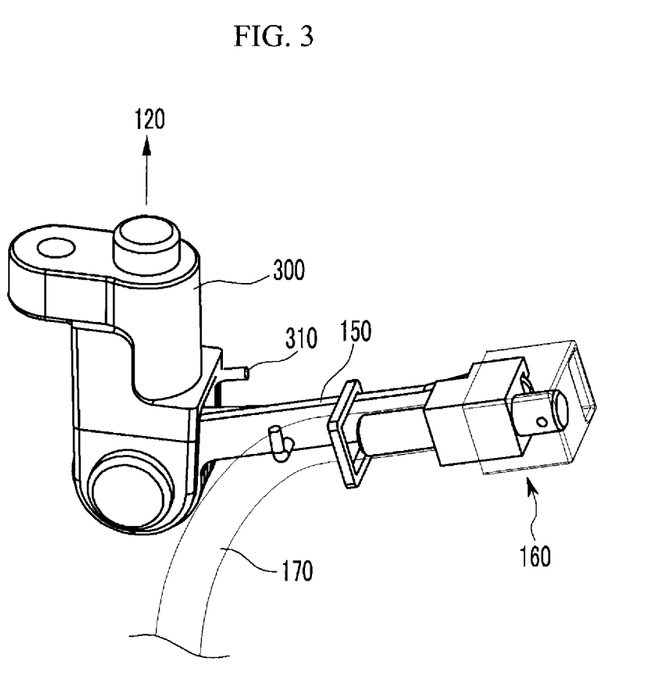
FIG. 3 is a perspective view of a torsion bar type vent unit that is mounted in a LPG fuel pump according to an exemplary embodiment of the present invention.

FIG. 3 is a perspective view of a torsion bar type vent unit that is mounted in a LPG fuel pump according to an exemplary embodiment of the present invention.

A torsion bar type lubricant vent unit is mounted on the main bracket 120, and the lubricant vent unit includes a fixed rod 300 that is inserted in the fixed rod mounting hole 640 of the main bracket 120, a torsion bar 150 that is connected to a lower end portion of the fixed rod 300 through a hinge, an spring type elastic member 310 that elastically holds the torsion bar 150 in a position, and a vent unit 160 that is mounted at one end of the torsion bar 150.

Referring to FIG. 1, the vent unit 160 is mounted at an upper end portion of the vent pipe 170 connected to the pump unit 100, and the vent unit 160 vents lubricant or gas generated in the pump unit 100.

The torsion bar 150 is elastically supported by the elastic member 310, and the noise and vibration of the vent unit 160 is reduced by the torsion bar 150 and the spring 310.

In the FIG. 7, the EFV check valve 140 regulates flowing amount of fuel pumped by the pump unit 100 within a predetermined value, and the remained amount is vented through the spare pipe 185 and the spare fuel separator. Referring to FIG. 6, the spare fuel separator 720 is mounted at a lower surface of the spare bracket 620 mounted on the main bracket 120.

The pump unit 100 includes a motor body 102 that a motor is built-in therein and a pump 104 pumping fuel by the motor.

Figure 2:
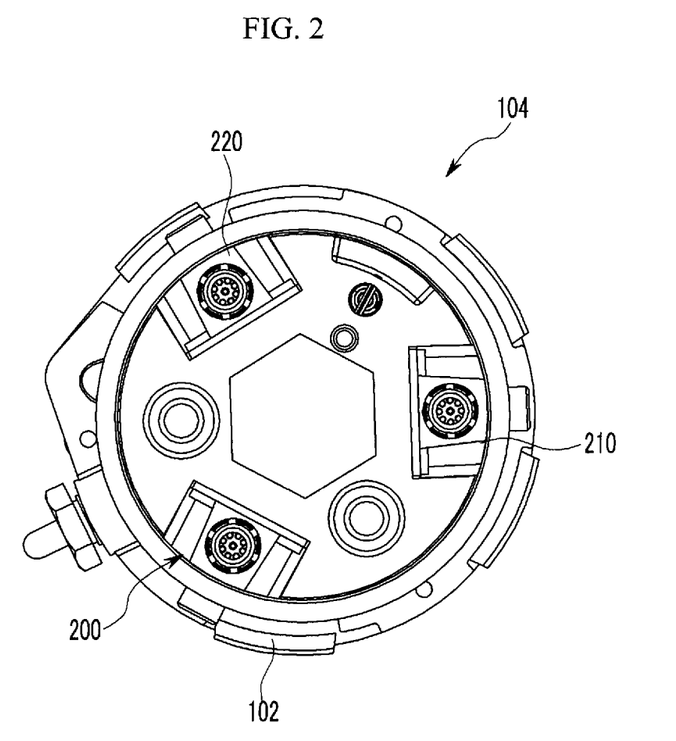
FIG. 2 is a bottom view showing interior of the pump unit in a LPG fuel pump according to an exemplary embodiment of the present invention.

FIG. 2 is a bottom view showing interior of the pump unit in a LPG fuel pump according to an exemplary embodiment of the present invention.

Referring to FIG. 2, the pump 104 of the pump unit 100 includes a first pumping portion 200, a second pumping portion 210, and a third pumping portion 220, is provided with three pumping portions, and the pumping portion is plunger type. Accordingly, small amount of fuel can be supplied, compared with 5 plunger type, such that noise and power consumption is decreased.

Figure 4:
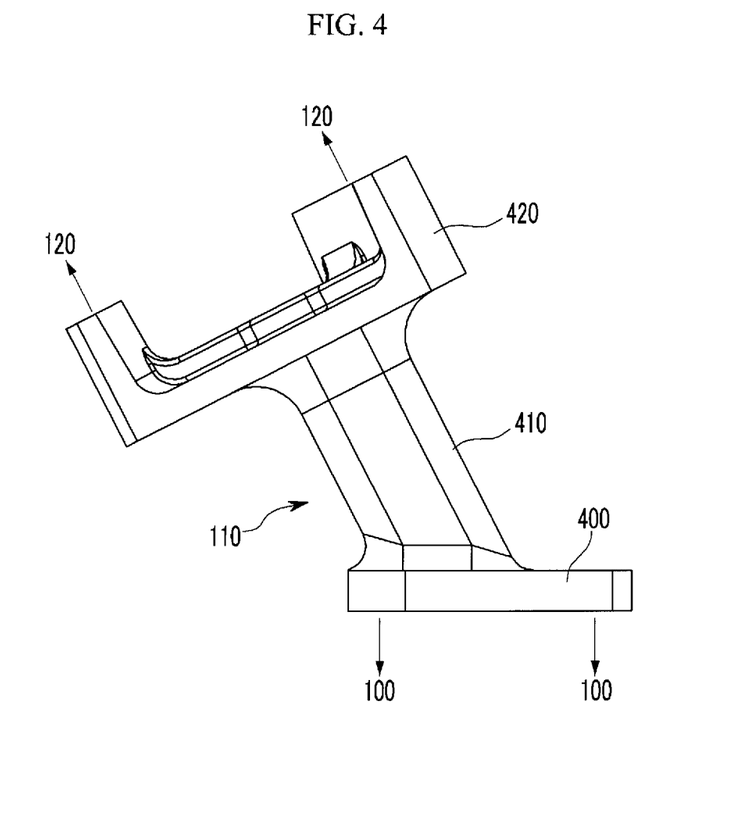
FIG. 4 is a side view of an integrated bracket that is mounted in a LPG fuel pump according to an exemplary embodiment of the present invention.

FIG. 4 is a side view of an integrated bracket that is mounted in a LPG fuel pump according to an exemplary embodiment of the present invention.

Referring to FIG. 1 and FIG. 4, an upper end of the integrated bracket 110 is fixed on the main bracket 120 by a bolt 114, and a lower end thereof is connected to the motor body 102 by a bolt 112.

Referring to FIG. 4, the integrated bracket 110 includes a center portion 410, a main bracket connection portion 420 of the upper part, and a pump connection portion 400 of the lower part.

In the integrated bracket 110, the center portion 410, the main bracket connection portion 420, and the pump connection portion 400 are all integrally formed such that the structure is secure and assembly thereof is simple.

Figure 5:
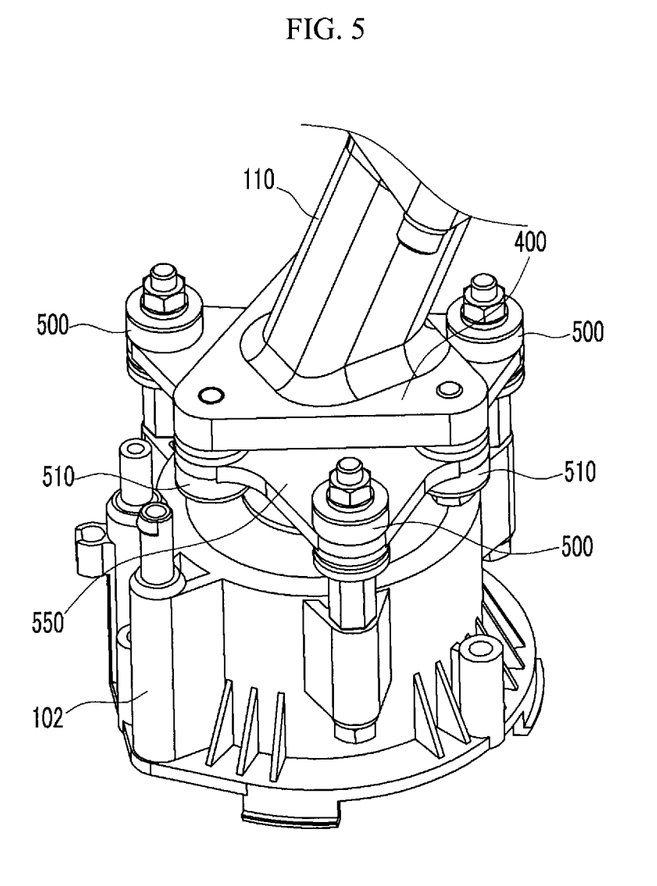
FIG. 5 is a partial perspective view of a LPG fuel pump according to an exemplary embodiment of the present invention.

FIG. 5 is a partial perspective view of a LPG fuel pump according to an exemplary embodiment of the present invention.

Referring to FIG. 5, the pump connection portion 400 of the integrated bracket 110 has a triangle shape, and a triangle shape insulation bracket 550 is disposed between the pump connection portion 400 and the motor body 102.

The insulation bracket 550 and the pump connection portion 400 have all triangle shape, does not correspond with each other, and the apex thereof crosses each other.

The insulation bracket 550 is connected to the motor body 102 through three first insulation portions 500, and is connected to the pump connection portion 400 of the integrated bracket 110 through three second insulation portions 510.

The first insulation portion 500 and the second insulation portion 510 is made up of elastic material such as oil resistance rubber so that the integrated bracket 110 is electrically insulated from the motor body 102 and the noise and vibration transferred from the motor body 102 to the integrated bracket 110 is decreased.

Referring to FIG. 1, a space 900 is formed between the motor body 102 and the integrated bracket 110, the space is formed by eliminating a built-in filter of the pump. In an exemplary embodiment of the present invention, the filter is mounted outside the fuel tank such that the maintenance is easy.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel pump for liquefied petroleum gas (LPG), comprising,
    a main bracket that is mounted at a fuel tank;
    an integrated bracket that an end thereof is fixed to the main bracket, the other end thereof is extended to an inner side of the fuel tank, and the whole of the bracket is integrally formed; and
    a pump unit that is fixed to the other end of the integrated bracket with a space therebetween so as to pump liquefied fuel to an engine,
    wherein a multi valve set penetrates the main bracket and is coupled thereto, the multi valve set including:
        a relief valve releasing a pressure;
        a Excess Flow Valve (EFV) check valve restricting a fuel flux pumped by the pump within a predetermined value; and
        a return valve returning a fuel returned from the engine to the inside of the fuel tank; and
    wherein a spare separator is fixed on a spare bracket and a spare pipe is inserted into the spare separator.

2. The fuel pump of claim 1, wherein the integrated bracket is formed monolithically.

3. The fuel pump of claim 1, wherein the pump unit includes
    a motor body coupled to the other end of the integrated bracket and including a motor therein; and
    at least a pumping portion to pump fuel by a torque of the motor.

4. The fuel pump of claim 3, wherein the at least a pumping portion includes three pumping portions that are disposed in a rotation direction of the motor so as to pump the fuel by a torque of the motor.

5. The fuel pump of claim 3, further comprising:
    a fixed rod that penetrates the main bracket and is fixed on the main bracket;
    a torsion bar that is rotatably mounted to an end portion of the fixed rod inside the fuel tank;
    an elastic member elastically biasing the torsion bar in a direction;
    a vent unit that is mounted at an end portion of the torsion bar; and
    a vent pipe connected to the vent unit and transferring a lubricant gas vented from the motor to the vent unit.

6. The fuel pump of claim 1, wherein a filter filtering foreign material in the fuel is disposed at the outside of the fuel tank.

7. The fuel pump of claim 1, wherein the spare bracket penetrates the main bracket and coupled thereto and an end of the spare pipe that spare fuel remained after being pumped by the pump unit flows therethrough is fixed on the spare bracket.

8. The fuel pump of claim 1, wherein the pump unit is fixed by an insulation portion to the other end of the integrated bracket with the space therebetween.

* * * * *